United States Patent
Zhang et al.

(10) Patent No.: US 12,283,996 B1
(45) Date of Patent: Apr. 22, 2025

(54) EFFICIENT NONLINEAR EQUALIZER FOR TRANSMITTER PREDISTORTION

(71) Applicant: Cisco Technology, Inc., San Jose, CA (US)

(72) Inventors: Hongbin Zhang, Holmdel, NJ (US); Sheng Zhang, Morganville, NJ (US); Tymon Barwicz, Holmdel, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 18/098,764

(22) Filed: Jan. 19, 2023

(51) Int. Cl.
  *H04B 10/588* (2013.01)

(52) U.S. Cl.
  CPC ..... *H04B 10/588* (2013.01); *H04B 2210/254* (2013.01)

(58) Field of Classification Search
  None
  See application file for complete search history.

(56) References Cited

U.S. PATENT DOCUMENTS

| | | | | |
|---|---|---|---|---|
| 9,929,813 B1 * | 3/2018 | Batshon | ............... | H04L 1/0042 |
| 2003/0236080 A1 * | 12/2003 | Kadous | ............... | H04L 1/0045 |
| | | | | 455/226.1 |
| 2015/0070089 A1 * | 3/2015 | Eliaz | ................... | H03F 1/3258 |
| | | | | 330/149 |

OTHER PUBLICATIONS

Yankov, "Constellation Shaping for Fiber-Optic Channels With QAM and High Spectral Efficiency," IEEE Photonics Technology Letters, vol. 26, No. 23, pp. 2407-2410, 1 Dec. 1, 2014, doi: 10.1109/LPT.2014.2358274. (Year: 2014).*

Dar, "Properties of nonlinear noise in long, dispersion-uncompensated fiber links", 2013 Optical Society of America, published Oct. 21, 2013, vol. 21, No. 22, DOI:10.1364/OE.21.025685, Optics Express 25685 (Year: 2013).*

Dar, "Accumulation of nonlinear interference noise in fiber-optic systems", Optical Society of America, published Jun. 3, 2014, vol. 22 , No. 12, DOI:10.1364/OE.22.014199, Optics Express 14199 (Year: 2014).*

* cited by examiner

*Primary Examiner* — Darren E Wolf
(74) *Attorney, Agent, or Firm* — K&L Gates LLP (57) ABSTRACT

A method, system and apparatus for mapping a symbol from a N-QAM constellation into a binary bit set, where N is the number of symbols in the constellation, and reducing the length of the binary bit set according to at least one property of nonlinear distortion by generating a lookup table (LUT) address from a LUT address generator, and adding the LUT address to a LUT of size smaller than $N^{(2M+1)}$, where 2M is the number of neighboring symbols to be stored.

23 Claims, 11 Drawing Sheets

Figure 6 Concept of the proposed PDPD pre-compensation (a) and the block diagram of the digital pre-compensator (b)

EFFICIENT NONLINEAR EQUALIZER FOR TRANSMITTER PREDISTORTION

BACKGROUND

Devices may experience signal distortions when power is increased.

BRIEF DESCRIPTION OF THE FIGURES

Various aspects and embodiments of the application will be described with reference to the following example embodiments. It should be appreciated that the figures are not necessarily drawn to scale.

SUMMARY

A method, system and apparatus for mapping a symbol from a N-QAM constellation into a binary bit set, where N is the number of symbols in the constellation, and reducing the length of the binary bit set according to at least one property of nonlinear distortion by generating a lookup table (LUT) address from a LUT address generator, and adding the LUT address to a LUT of size smaller than $N^{(2M+1)}$, where 2M is the number of neighboring symbols to be stored.

DETAILED DESCRIPTION

In some embodiments, there may a benefit to increasing signal power to transmit through a loss link without Erbium-doped fiber amplifier (EDFA). In many embodiments, signal power may be increased by increasing driver output peak-peak signal. In some embodiments, signal power may be increased by integrating a semiconductor optical amplifier (SOA) with a photonics integrated circuit. In most embodiments, Applicant has realized that a driver and a SOA may introduce different types on nonlinear distortion into a signal.

In certain embodiments, signal power may be increased by implementing a pre-compensation look-up table (LUT) to compensate nonlinearity of a semiconductor optical amplifier (SOA) and/or drivers. In certain embodiments, a LUT may not be traditionally used in high-order quadrature amplitude modulation (QAM) constellation transponders since this may result in a total $2^{(2M+1)log_2 N} = N^{2M+1}$ combinations with memory length of 2M+1 symbols from N-constellation. In certain embodiments, N may be the number of symbols in a constellation.

In most embodiments, transmitting a nonlinear equalizer (TNE) may provide pre-distortion by small-size LUTs on four streams, namely H-polarization In-phase (HI), H-polarization Quadrature (HQ), V-polarization In-phase (VI), and V-polarization Quadrature (VQ) to address shortcomings of traditional implementations.

In most embodiments, Applicants realize that after bit mapping, simple logic functions may choose combinations of $2^K$ out of $2^{(2M+1)log_2 N}$ to create a LUT applying certain properties of nonlinear distortion. In some embodiments, the symmetrical property of nonlinear distortion may be exploited. In some embodiments, the rotational symmetry property of nonlinear distortion may be exploited.

Traditional EDFA amplifiers typically have a high cost, are unable to integrate with photonics integrated circuit (PIC) and are not feasible in O-band (1260-1360 nm).

Figure 1A:
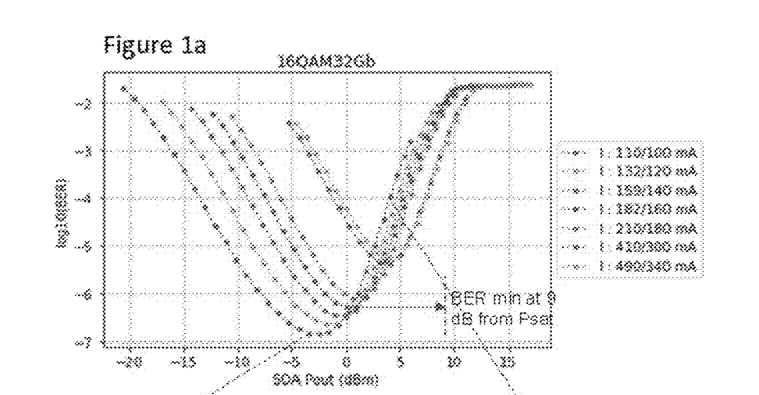
FIGS. 1a, 1b, 1c, and 1d illustrate issues that may be solved by the instant disclosure be solved that may be present in an implementation, in accordance with embodiments of the present disclosure.
Figures 1B, 1C:
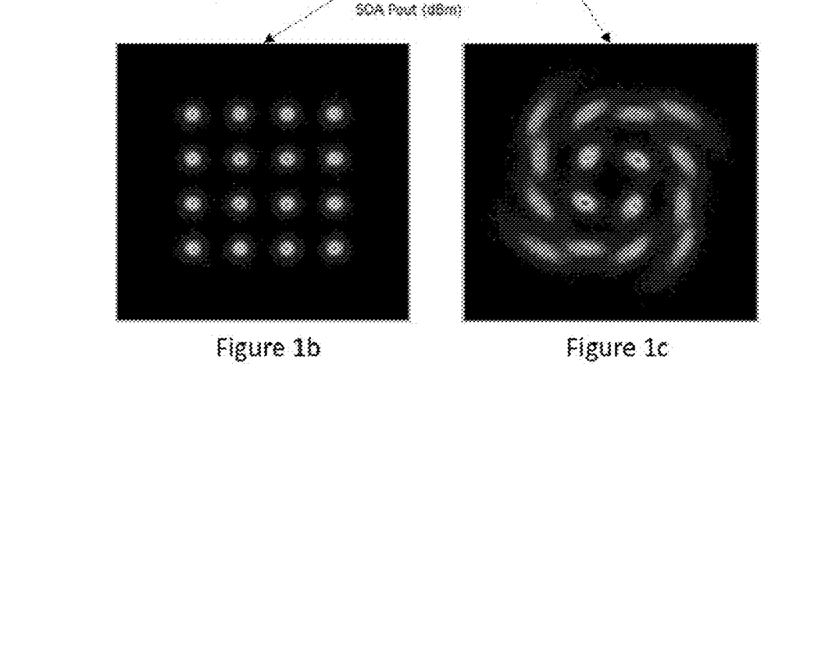
Figure 1D:
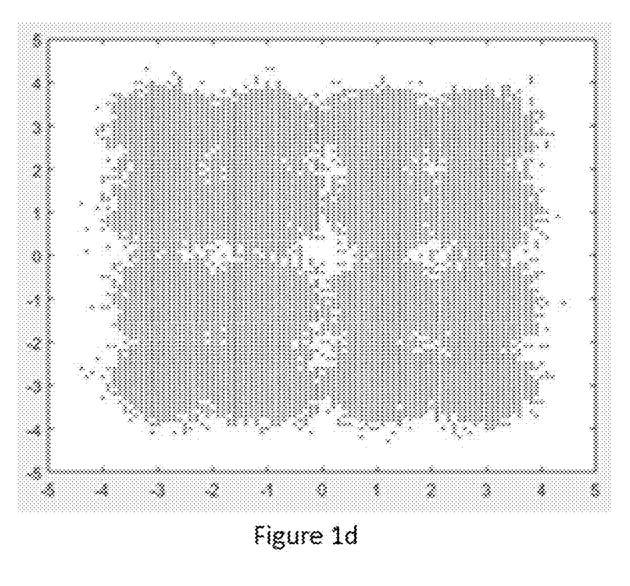

Refer now to the example embodiments of FIGS. 1a, 1b, 1c, and 1d which illustrate the nonlinear distortions from both driver and SOA. FIGS. 1a, 1b, 1c, and 1d illustrate performance restraints on current constellation transmissions. FIG. 1a illustrates a graph of a 16QAM constellation at 32 Gb, with BER compared to SOA Pout at different bias current. In certain embodiments, to minimize power consumption, a small SOA bias current may give a small saturation power $P_{sat}$. As a result, in certain embodiments, a SOA may likely operate near a saturation region in which pattern-dependent distortion seriously impacts performance. The example embodiment of FIG. 1b illustrates a base-case 16QAM constellation at 32 Gb with minimal distortion. The example embodiment of FIG. 1c illustrates a pattern-dependent distortion due to fast carrier density change caused by rapidly changing optical intensity which seriously impacts performance. The example embodiment of FIG. 1d illustrates deterministic distortion caused by increased driver output peak-peak swing, which degrades the effective number of bits (ENOB) transmitted. In most embodiments, digital pre-compensation may be achieved with a LUT. Applicants realize that in most embodiments a smaller LUT may increase digital pre-compensation efficiency.

Figure 2A:
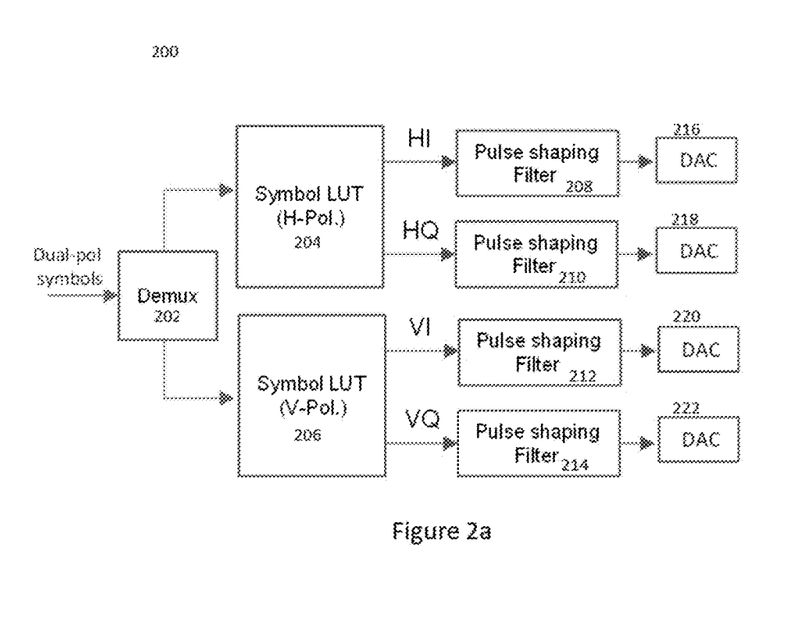
FIGS. 2a and 2b illustrate an implementation of a look-up table (LUT), in accordance with embodiments of the present disclosure.
Figure 2B:
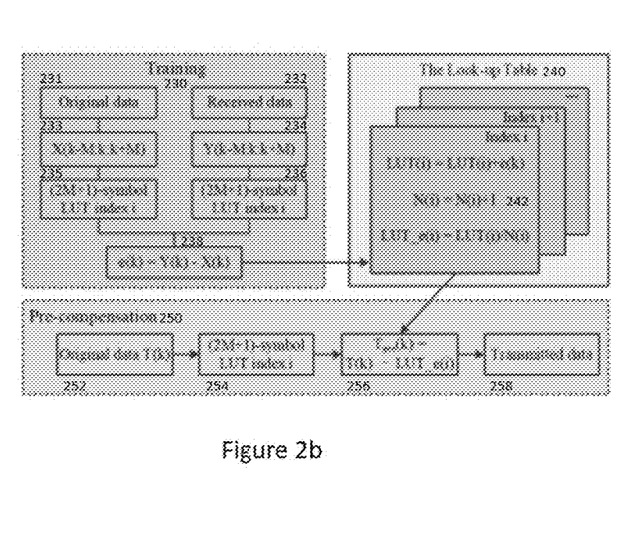

Refer now to the example embodiments of FIGS. 2a and 2b which illustrate an example embodiment of an implementation of a LUT such as LUT 240, or LUT 204/206. Demux 202 accepts dual polarization symbols, which demultiplexes the input and sends the demultiplexed symbols to Symbol LUT (H-Pol.) 204 and Symbol LUT (V-Pol.) 206. H-Pol. LUT 204 separates HI from HQ and sends each to Pulse shaping Filter(s) 208 and 210, respectively. V-Pol. LUT 206 separates VI from VQ and sends each to Pulse shaping Filter(s) 212 and 214, respectively. Each of Pulse shaping Filters 208, 210, 212 and 214, send their respectively shaped inputs to DAC(s) 216, 218, 220, and 222, respectively. Training module 230 has Original data 231, which is processed by blocks 233 and 235. Received data 232 is processed by blocks 234 and 236. The output of Blocks 235 and 236 are combined into processing function 238, which is used to produce Look-up Table 240. Pre-compensation 250 processes Original data 252 with blocks 254 and 256 to create Transmitted data 258. Look-up table 240 is used to construct logic used in processing block 256.

In some embodiments, digital pre-compensation using a LUT such as LUT 240 have been used to linearize RF power amplifiers and SOA pre-compensation in direct detection. Returning to FIGS. 2a and 2b, LUT 240 can be adaptively trained without need for an accurate model for nonlinear distortions. The accuracy of LUT 240 is dependent on its memory length 2M+1 as shown in processing blocks 235/236, which is the length of symbols associated with the nonlinear distortion of the training symbol. For an N-QAM, which encodes log 2(N) bits per symbol using N constellation points, LUT 240 has size as $N^{(2M+1)}$ if the memory length is 2M+1. For example, the LUT for 16QAM has total $16^3=4096$ combinations if the memory length is 3 symbols. Each combination of $N^{(2M+1)}$ transmitted symbols can be mapped to an address of LUT 240. In most embodiments, Applicants realize that a large LUT size may limit the practical implementation. In certain embodiments, a practical implementation may be limited when a LUT is built for SOA pre-compensation since I and Q distortion are not independent.

Figure 3:
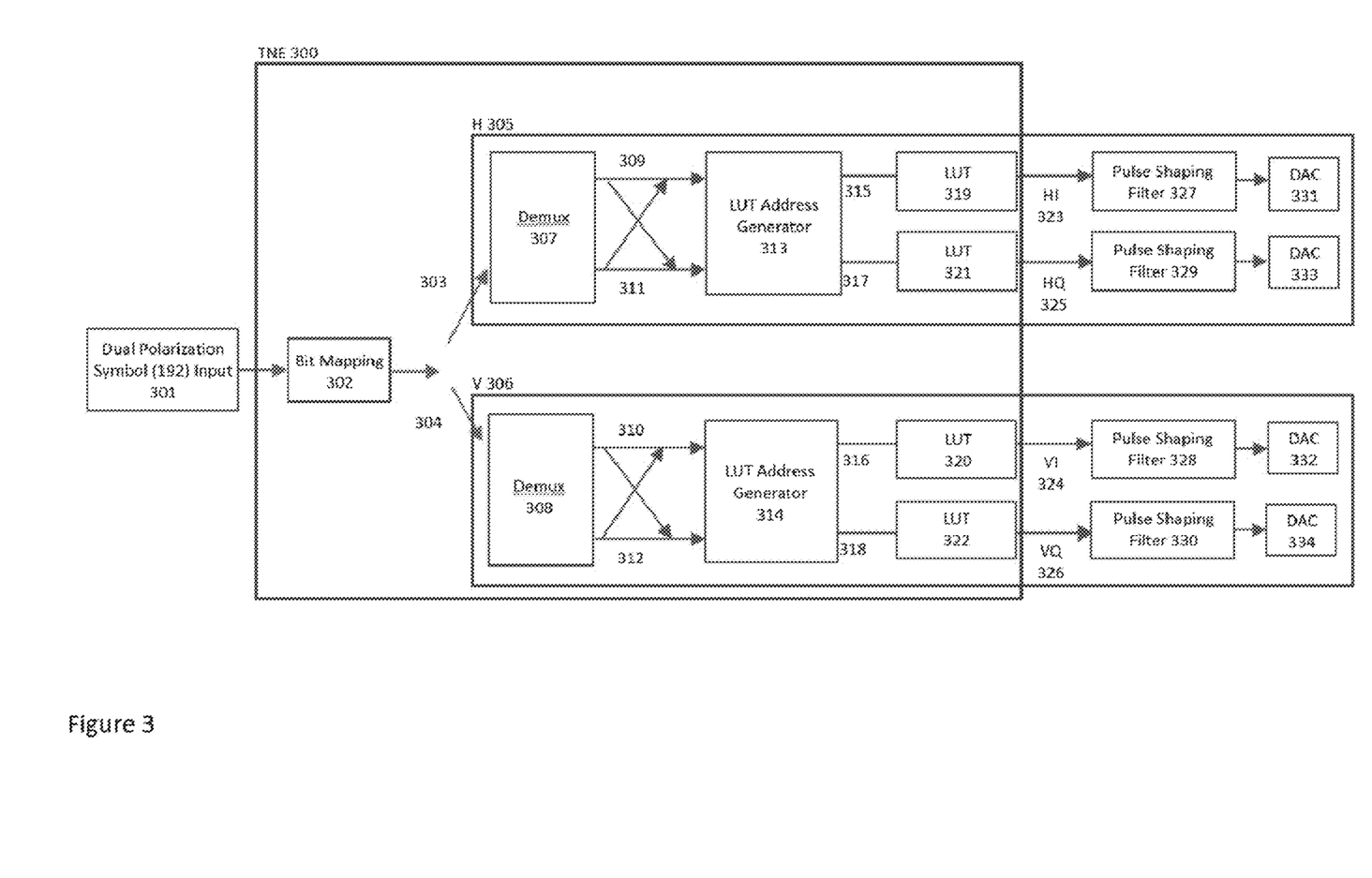
FIG. 3 illustrates an example embodiment of a transmitter nonlinear equalizer (TNE) based on a reduced set of bits, in accordance with an embodiment of the present disclosure.

Refer now to the example embodiment of FIG. 3 which illustrates an example embodiment of a transmitter nonlinear equalizer (TNE) based on a reduced set of bits. TNE 300 accepts 192-Dual Polarization Symbols Input 301. Bit Mapping 302 maps Input 301 into two streams of 192×6 binary bits 303 and 304 and sends binary bits 303 and 304 to Demultiplexers 307 and 308, respectively. Demultiplexers 307 and 308 separate 192×3 In-Phase 309/310 from 192×3 Quadrature 311/312 and sends each In-Phase 309/310 and each Quadrature 311/312 to LUT Address Generators 313 and 314, respectively. LUT Address Generators 313/314 map (2M+1)×3 bits in 309/310/311/312 into 8 bits address in 315/316/317/318. LUTs 319/320 and 321/322 use 192×8 bits addresses to output 192 pre-distorted symbols with 6 bits resolution in HI 323 & VI 324 and HQ 325 & VQ 326, respectively. HI 323 & VI 324 and HQ 325 & VQ 326 each enter their respective Pulse Shaping Filters 327, 328, 329, and 330. Pulse Shaping Filters 327, 328, 329, and 330, send the resultant shaped symbols to each of DACs 331, 332, 333, and 334.

In most embodiments, an input, such as Input 301, may be sent every clock cycle. In some embodiments, an input, such as Input 301, may be mapped and separated into four 192×3 tributaries (e.g., In-Phase 309/310 and Quadrature 311/312) via Bit Mapping 302 and Demultiplexers 307 and 308. In some embodiments, for each clock cycle, a Bit Mapping 302 maps the amplitude level in I/Q axis into ($b_2$, $b_1$, $b_0$) as follows:

| Amplitude Level | 3-bit Level | Binary | | |
|---|---|---|---|---|
| 7 | 3 | 0 | 1 | 1 |
| 5 | 2 | 0 | 1 | 0 |
| 3 | 1 | 0 | 0 | 1 |
| 1 | 0 | 0 | 0 | 0 |
| −1 | −1 | 1 | 0 | 0 |
| −3 | −2 | 1 | 0 | 1 |
| −5 | −3 | 1 | 1 | 0 |
| −7 | −4 | 1 | 1 | 1 |

In most embodiments four streams, namely H-polarization In-phase (HI), H-polarization Quadrature (HQ), V-polarization In-phase (VI), and V-polarization Quadrature (VQ) may be converted and transmitted.

In some embodiments, drivers on I-channel and Q-channel may be independent from each other, and driver nonlinear distortion may also be independent. Take an example embodiment of driver nonlinearity compensation with memory length 2M+1=3. In this embodiment, $(2M+1)\log_2 N=3\times6=18$ bits may map to 8 bits address by exploiting the property that I and Q distortion are independent and are anti-symmetric between positive and negative amplitude level.

Referring to the example embodiment of FIG. 3, transmitting HI 323, VI 324, HQ 325, and VQ 326 in TNE 300 takes 192 3×3 bits (309/310 and 311/312) from its own tributary (memory length=3). There are 192 sets of 4 LUTs inside each TNE 300, and the address Address(k) of LUT (k), k=0, 1, . . . , 191 are generated as:

| Address(k) | |
|---|---|
| Bit 0 | b2(k − 1) XOR b2(k) |
| Bit 1 | b2(k + 1) XOR b2(k) |
| Bit 2 | b1(k) |
| Bit 3 | b0(k) |
| Bit 4 | b1(k − 1) |
| Bit 5 | b0(k − 1) |
| Bit 6 | b1(k + 1) |
| Bit 7 | b0(k + 1) |

Figure 4:
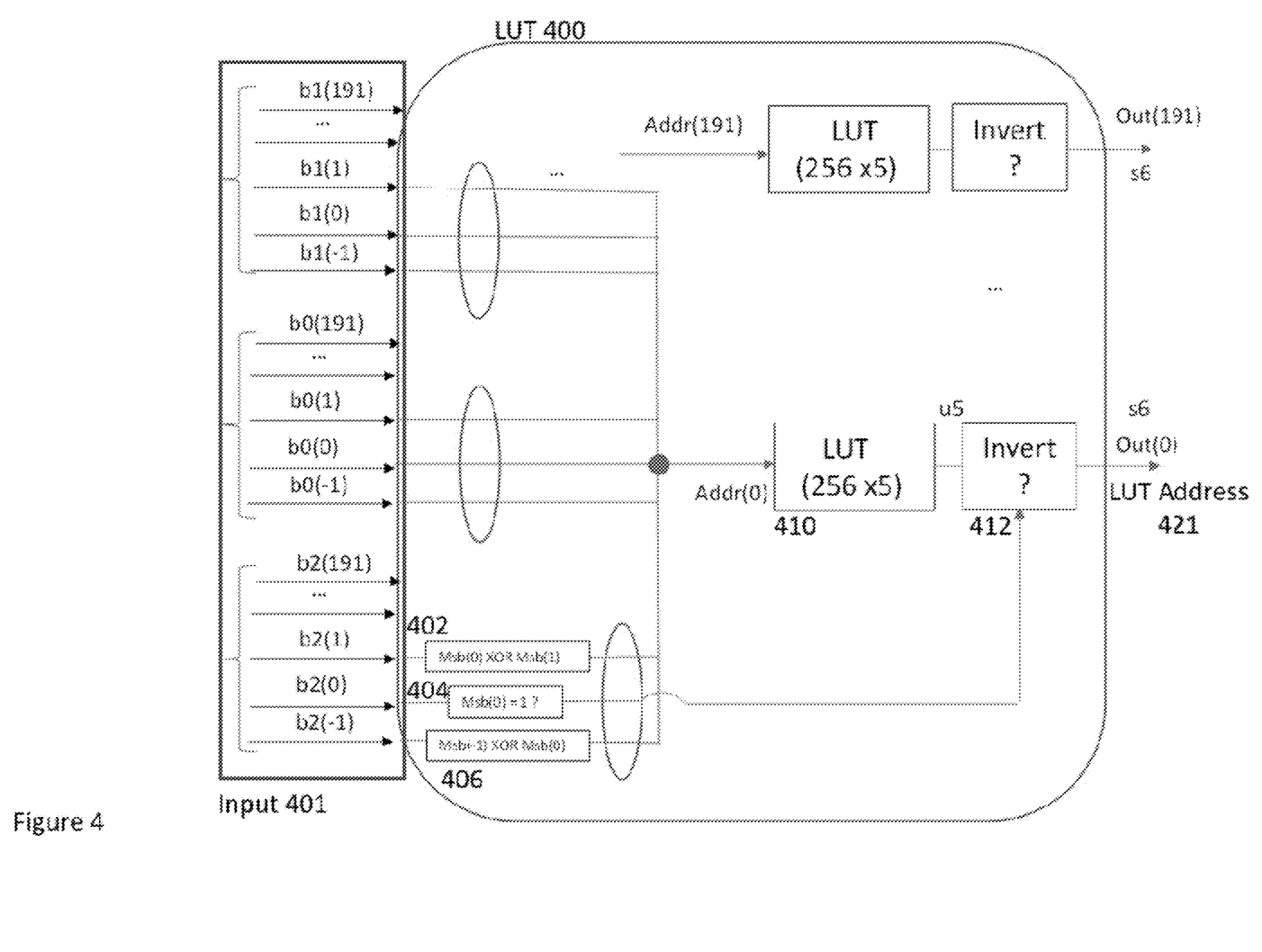
FIG. 4 illustrates a 192 Look-Up Table (LUT), in accordance with an embodiment of the present disclosure.

Refer now to the example embodiment of FIG. 4 which illustrates a 192 Look-Up Table (LUT) 400 such as LUTs 319, 320, 321, and 322 of FIG. 3 for driver nonlinearity compensation. LUT 400 receives Input 401 to generate 192×8 addresses (Addr(0), . . . , Addr(191)) in 410. Take an example of the first address, Addr(0), Block 402 performs XOR operation between b2(1) and b2(0), i.e., MSB(1) XOR MSB(0), Block 404 checks if b2(0) equals to 1, i.e., MSB (0)=1?. Block 406 performs XOR operation between b2(−1) and b2(0), i.e., MSB(−1) XOR MSB(0). Block 412 adds a 6th bit as a binary negative/not negative, and LUT Address 421 may be passed out of LUT 400 with 6 bits.

Figure 5A:
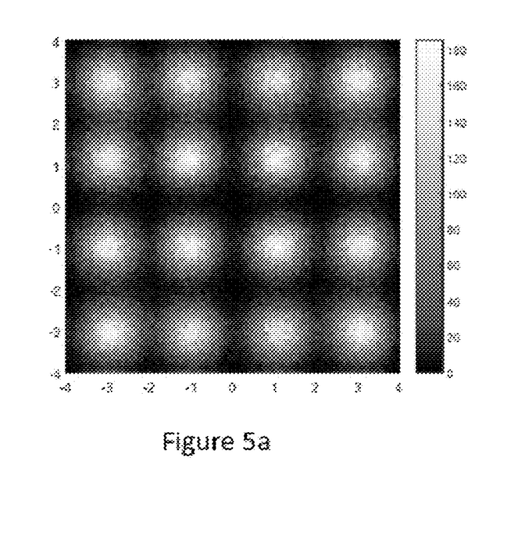
FIGS. 5a, 5b, and 5c illustrate receiver constellation improvement by TNE and measured symbol distortion before/after pre-distortion, in accordance with embodiments of the present disclosure.
Figure 5B:
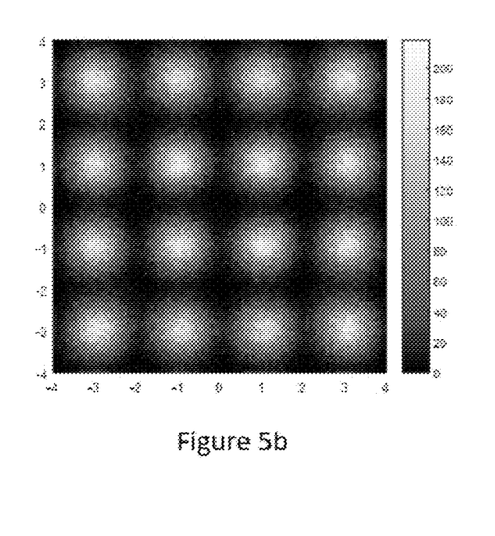
Figure 5C:
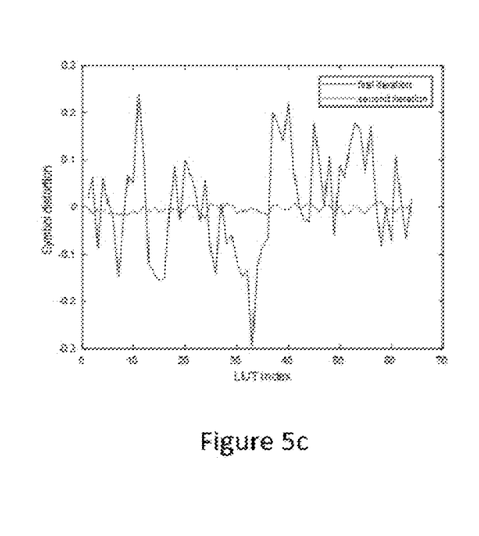

Refer now to the example embodiments of FIGS. 5a, 5b, and 5c which illustrate receiver constellation improvement by TNE and measured symbol distortion before/after pre-distortion for driver nonlinearity compensation. FIG. 5a illustrates a receiver constellation without TNE. FIG. 5b illustrates a receiver constellation with TNE. FIG. 5c illustrates a TNE table which shows symbol distortion with a first and a second iteration of TNE. The TNE table may be iteratively trained using the received data after carrier phase recovery. The measured symbol distortion may be applied in TNE table to get an improvement in the next iteration. In some embodiments, TNE may be iterated once. In some embodiments, TNE may be iterated more than once. In certain embodiments, TNE may be iterated two or more times. In certain embodiments, TNE may be iterated three or more times.

Figure 6:
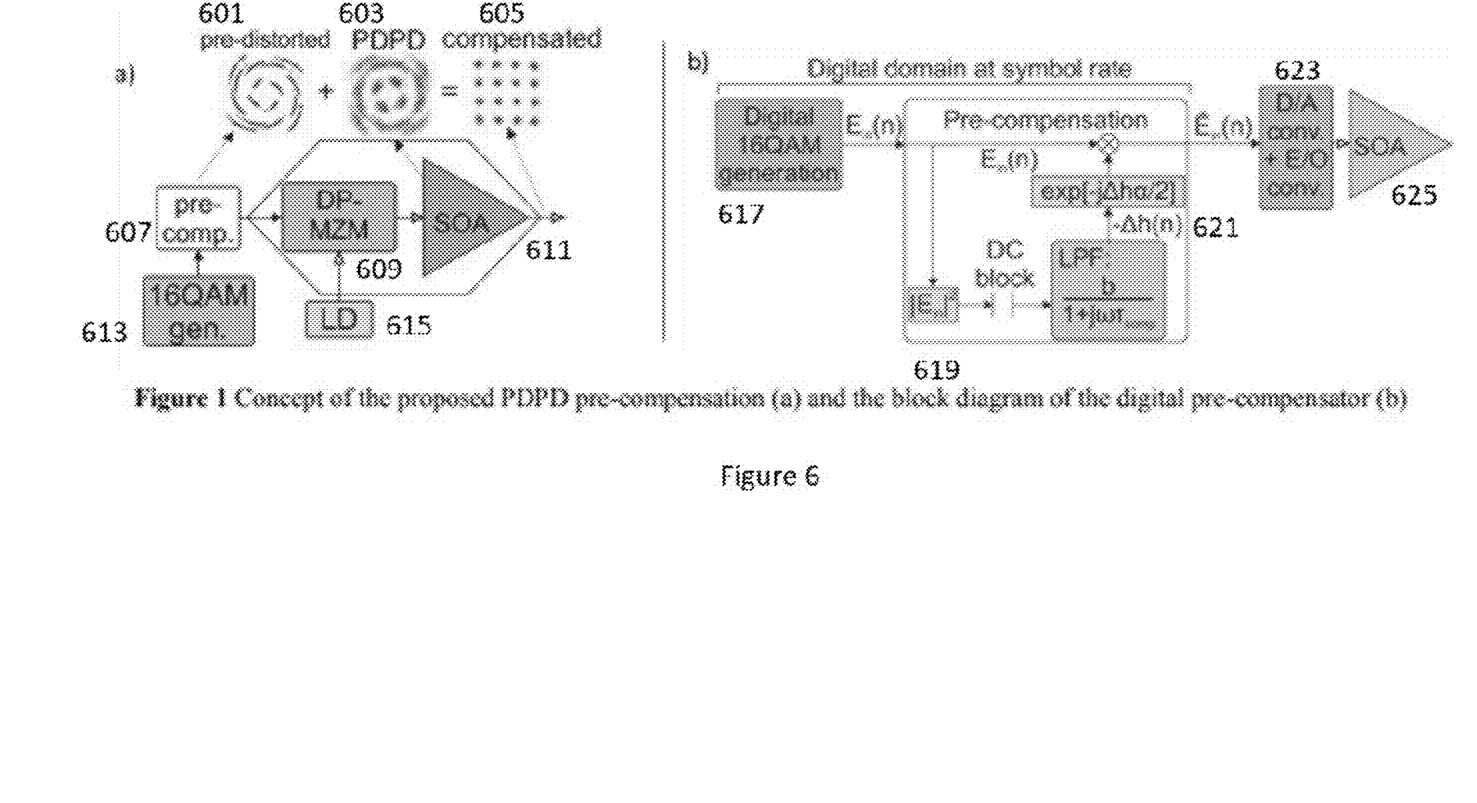
FIG. 6 illustrates semiconductor optical amplifier (SOA) nonlinearity compensation, in accordance with an embodiment of the present disclosure.

Refer now to the example embodiment of FIG. 6 which illustrates an example embodiment of a method for SOA pre-compensation. In FIG. 6, SOA distortion may behave like a pattern-dependent phase distortion (PDPD). PDPD pre-compensation occurs when 16QAM gen. 613 sends a signal to pre-comp. 607, which creates pre-distorted pattern 601. Pre-comp. 607 sends its output to DP-MZM 609. With input from LD 615, DP-MZM produces an output and sends it to SOA 611. Distortion added from SOA 611 is shown in 603 PDPD. Pre-distorted 601, combined with 603 PDPD, outputs 605 Compensated. Digital pre-compensation occurs when $E_{in}(n)$ signal from digital 16QAM generation 617 is sent to and transformed by pre-compensation 619. After Pre-compensation 619, new signal $\hat{E}_{in}(n)$ is sent to Digital/Analog+Electrical/Optical Conversion 623. D/A+E/O 623 sends its output to SOA 625.

In some embodiments, SOA distortion behaves like a pattern-dependent phase distortion (PDPD) 603. SOA gain fluctuation $\Delta h(n)$ 621 which is compensated for in Pre-Compensation 619 may be estimated by transmitted symbol power, $|E_{in}|^2$ after a low-pass filtering. Referring back to the example embodiment of FIG. 6, the estimated gain fluctuations 621 are used to pre-distort the phase of the symbol 601.

In many embodiments, digital pre-compensation for a SOA may be implemented with digital pre-compensation using a LUT. In most embodiments, SOA gain fluctuation may be a dependent optical input power of preceding symbols. In most embodiments, a least significant bit (LSB) b0 may determine the amplitude level of a symbol in according to Bit Mapping 302 Table. In most embodiments, most significant bit (MSB) bit b2 and LSB bit b0 of current symbol k and LSB bit of two preceding symbols k−1, and k−2 may be used. In most embodiments, input bits from both I and Q tributaries may be used to pre-distort phase. In some embodiments with an 8-bit LUT address generator and memory length 3 symbols, 192 Address(k), k=0, 1, . . . 192 of LUTS in both in-phase and quadrature TNE may be generated as:

| Address(k) | |
| --- | --- |
| Bit 0 | In-phase b2(k) |
| Bit 1 | In-phase b0(k) |
| Bit 2 | Quadrature b2(k) |
| Bit 3 | Quadrature b0(k) |
| Bit 4 | In-phase b0(k − 1) |
| Bit 5 | In-phase b0(k − 2) |
| Bit 6 | Quadrature b0(k − 1) |
| Bit 7 | Quadrature b0(k − 2) |

Figure 7A:
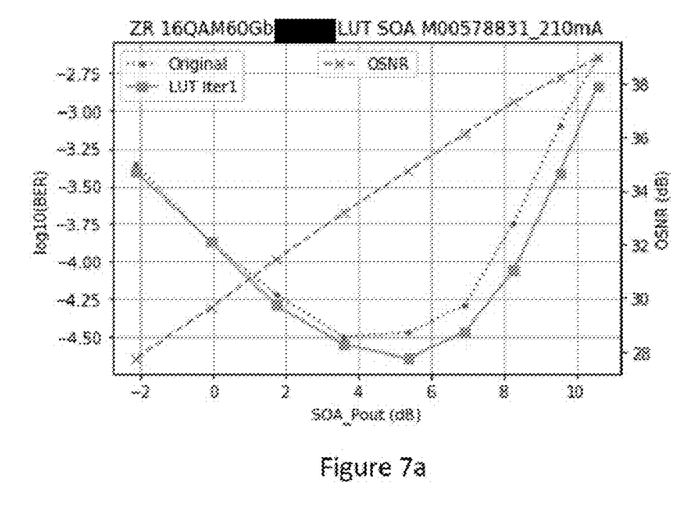
FIGS. 7a and 7b illustrate TNE improvements at high and low baud rates, in accordance with embodiments of the present disclosure.
Figure 7B:
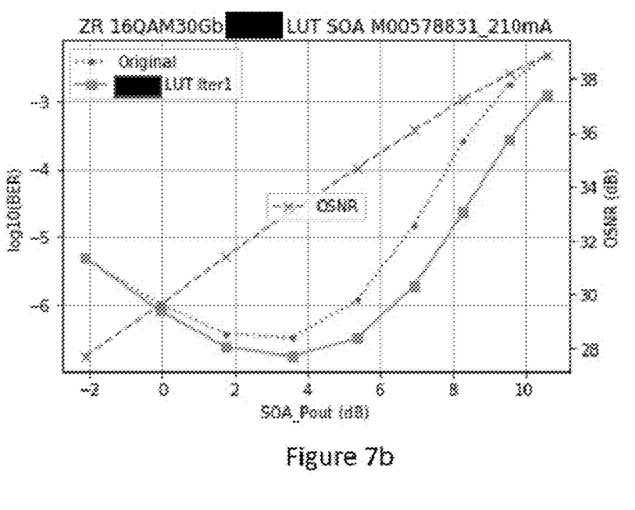

Refer now to the example embodiments of FIGS. 7a and 7b, which illustrate TNE improvements at high and low baud rates for different SOA output powers by attenuating SOA input. The pre-compensation for different SOA output power may be tested by attenuating the SOA input. FIG. 7a illustrates performance improvements by using TNE at 60 Gbaud. FIG. 7b illustrates performance improvements by using TNE at 30 Gbaud. FIGS. 7a and 7b show that TNE may improve output power by ~1 dB with the same BER performance at both 30 Gbaud and 60 Gbaud 16 QAM. In some embodiments, the TNE may significantly improve output power for other speeds and power levels.

Figure 8:
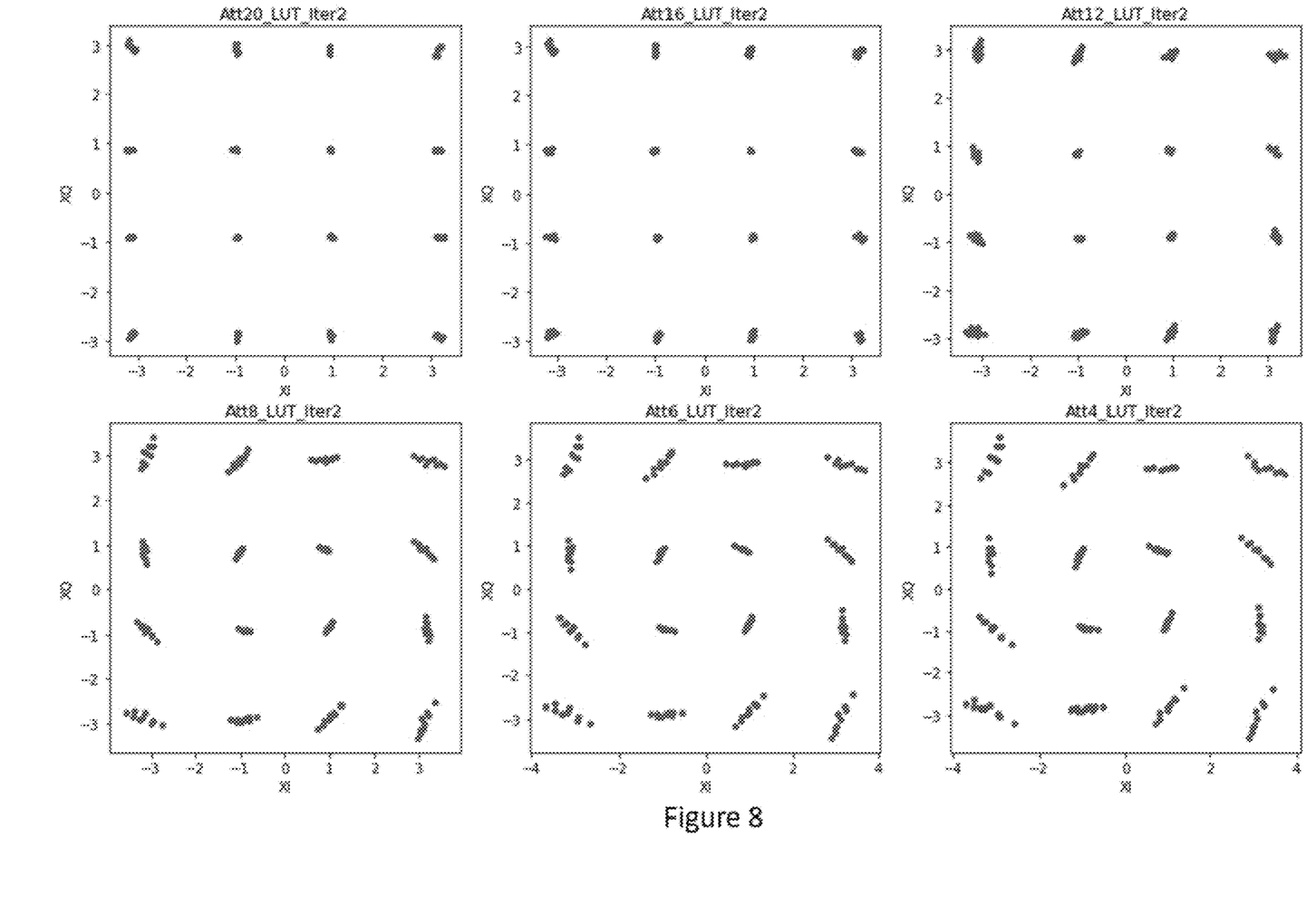
FIG. 8 illustrates an example embodiment of pre-distorted 16QAM at various SOA output powers with a constant current of 210 mA, in accordance with an embodiment of the present disclosure.

Refer now to the example embodiment of FIG. 8 which illustrates an example embodiment of pre-distorted 16QAM at various SOA output powers with a constant bias current of 210 mA.

Figure 9:
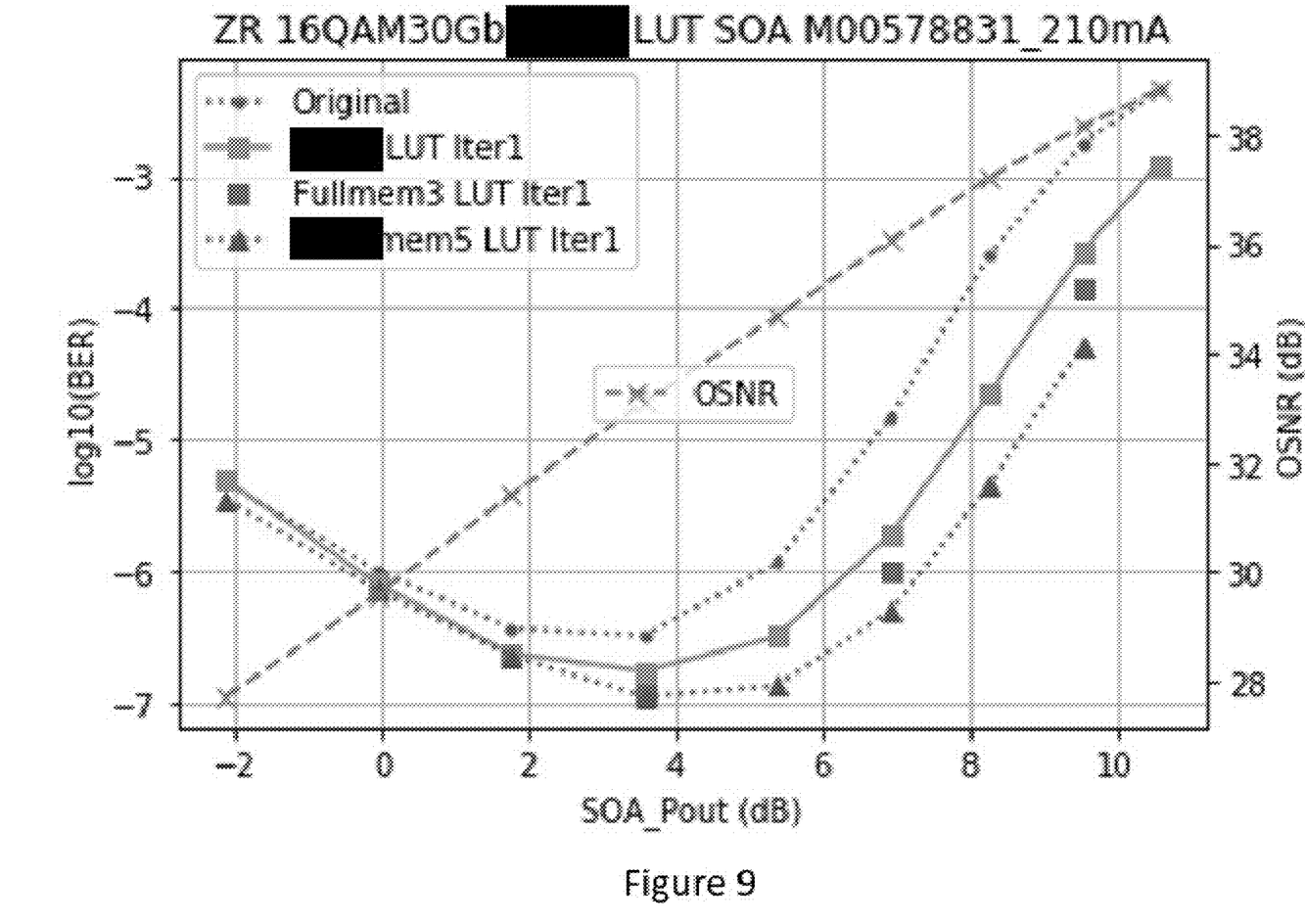
FIG. 9 illustrates an example embodiment of LUT size 2048 with memory length of 5 symbols, in accordance with an embodiment of the present disclosure.

Refer now to the example embodiment of FIG. 9, which illustrates an example embodiment of LUT size 2048 with memory length of 5 symbols for SOA compensation. A direct LUT addressing by 16QAM symbols would be of size 16^5 (1,048,576) entries. However, Applicants have realized in this embodiment that by using only the LSB bits for neighboring bits, the LUT address table may be reduced to size of only 2^12 (4,096) entries. Applicants have further realized that in this embodiment using memory length of 2M+1=5 symbols may improve output power by 2 dB. In some embodiments, larger memory length of 2M+1 may be used. In most embodiments of memory length 2M+1, output power may similarly be improved.

Figure 10:
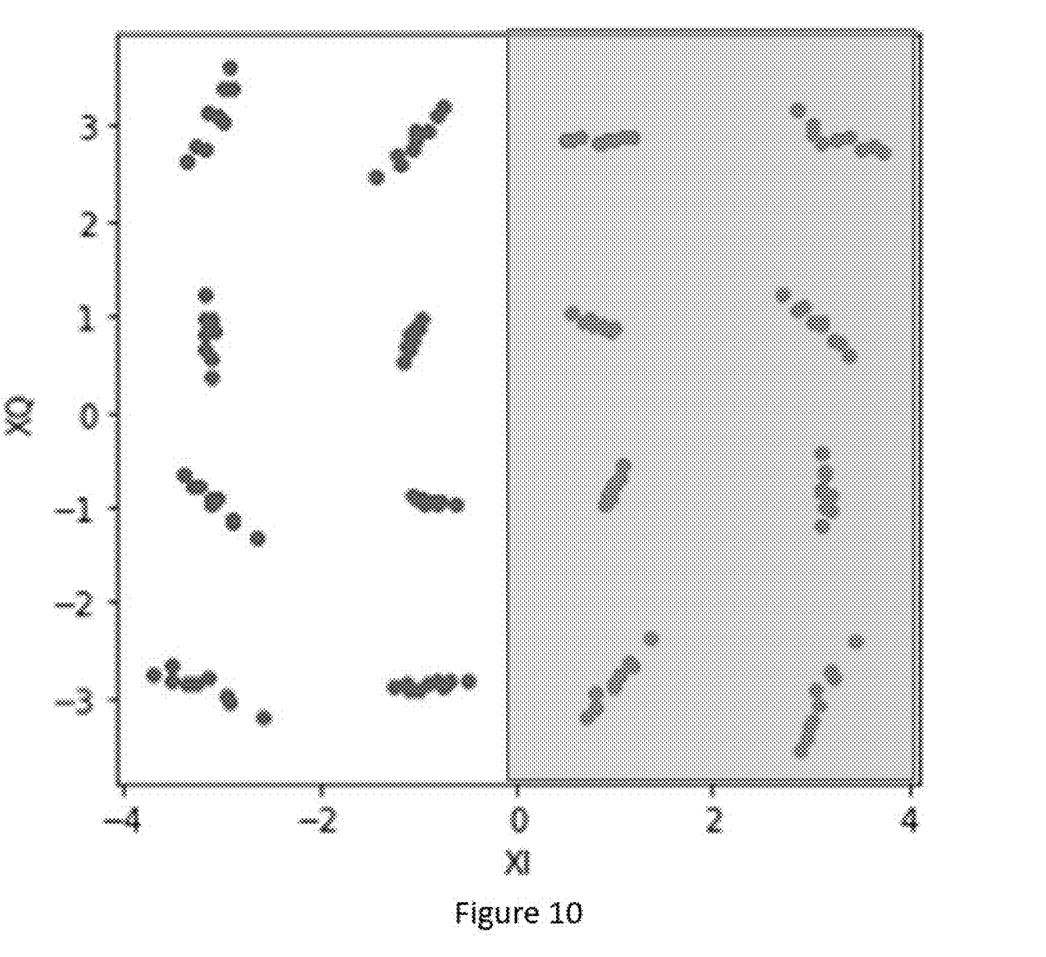
FIG. 10 illustrates an example embodiment of constellation pre-distortion symmetry about 180 degrees, in accordance with an embodiment of the present disclosure.

Refer now to the example embodiment of FIG. 10, which illustrates an example embodiment of constellation pre-distortion symmetry about 180 degrees. In this embodiment, Applicants have realized the symmetric property of pre-distortion about 180 degrees may allow for a further reduction of LUT size. In certain embodiments, Applicants have realized that the symmetry property allows the address size of a LUT to be reduced by one bit, (i.e., cut storage size in half). In some embodiments, Applicants have realized that in a 16QAM as shown, the address table size for a LUT of 2^12 (4,096) bits may be reduced to size 2^11 (2,048) bits by inverting the output of LUT if in-phase b2(k) is equal to 1. In many embodiments, the address table of the resultant 16QAM LUT for SOA TNE with memory length of 5 symbols may be generated as follows:

| Address(k) | |
| --- | --- |
| Bit 0 | In-phase b2(k) XOR Quadrature b2(k) |
| Bit 1 | In-phase b0(k) |
| Bit 2 | In-phase b0(k − 1) |
| Bit 3 | In-phase b0(k − 2) |
| Bit 4 | In-phase b0(k − 3) |
| Bit 5 | In-phase b0(k − 4) |
| Bit 6 | Quadrature b0(k) |
| Bit 7 | Quadrature b0(k − 1) |
| Bit 8 | Quadrature b0(k − 2) |
| Bit 9 | Quadrature b0(k − 3) |
| Bit 10 | Quadrature b0(k − 4) |

Figure 11:
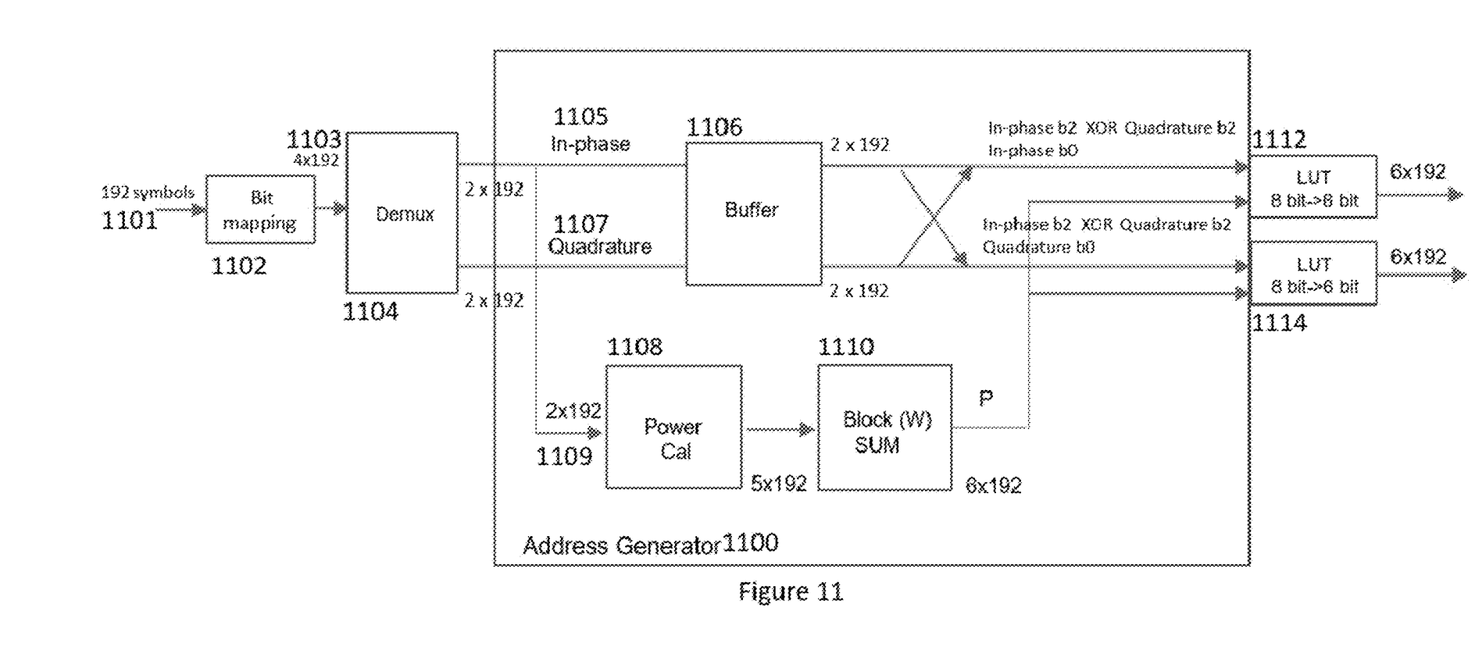
FIG. 11 illustrates an example embodiment of Address Generator 1100 which may further reduce an address LUT size by simple power calculation, in accordance with an embodiment of the present disclosure.

Refer now to the example embodiment of FIG. 11 which illustrates an example embodiment of Address Generator 1100 which may further reduce an address LUT size by a simple power calculation with a SOA. Address Generator 1100 may further reduce an address LUT of size 2^11 shown above with respect to FIG. 10 to an address LUT of size 2^8 as the following: Bit Mapping 1102 accepts 192-symbols Input 1101. Demux 1104 accepts the output of Bit Mapping 1102 and separates Bitmapped Symbols 1103 it into In-Phase 1105 and Quadrature 1107. Buffer 1106 accepts In-Phase 1105 and Quadrature 1107. After Buffer 1106, In-Phase 1105 b2 XOR Quadrature 1107 b2 and In-Phase b0 are passed to LUT 1112. After Buffer 1106, In-Phase 1105 b2 XOR Quadrature 1107 b2 and Quadrature b0 are passed to LUT 1114.

Power Cal 1108 receives In-phase b0($k$) and Quadrature b0($k$), k=0, 1, . . . , 191 1109 and calculates symbol power, Power(k). For 16QAM symbol, each symbol has possible power level as 2, 10 and 18 using the following equation:

$$\text{Power}(k) = (\text{In-phase } b0(k) == 1)?9:1 + (\text{Quadrature } b0(k) == 1)?9:1$$

BLOCK SUM 1110 calculates the summation of the power of W−1 preceding symbols and current symbol:

BLOCK_SUM(k)=sum(Power(k),
   Power(k−1), . . . ,Power(k−W+1)),
   k=0,1, . . . ,191.

If W=10, then maximum value of BLOCK_SUM is 18×10=180 and minimum value of BLOCK_SUM is 2×10=20. Therefore, BLOCK_SUM has unsigned 8 bits, we can reduce BLOCK_SUM to unsigned 6 bits by right shifter operation P(k)=BLOCK_SUM(k)>>2

Bits b2 through b10 may be replaced with 6 bits of P number in Block Sum 1110 output. Bits b2 through b7 are received by LUT 1112/1114 and combine with bits b0 and b1 as shown below:

| Address(k) | |
| --- | --- |
| Bit 0 | In-phase b2(k) XOR Quadrature b2(k) |
| Bit 1 | In-phase b0(k) |
| Bit 2 | P(0) |
| Bit 3 | P(1) |
| Bit 4 | P(2) |
| Bit 5 | P(3) |
| Bit 6 | P(4) |
| Bit 7 | P(5) |

One or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

The invention claimed is:

1. A method comprising:
   mapping a symbol from an optical N-QAM (quadrature amplitude modulation) constellation into a binary bit set; wherein N is the number of symbols in the constellation;
   reducing a length of the binary bit set; wherein the reduction is performed according to at least one property of nonlinear distortion;
   generating a lookup table (LUT) address from a LUT address generator; and
   adding the LUT address to a LUT of size smaller than N^(2M+1); wherein 2M is the number of neighboring symbols to be stored.

2. The method of claim 1, the method further comprising:
   creating a pre-compensation pattern with data stored in the LUT.

3. The method of claim 2, the method further comprising:
   pre-compensating the optical N-QAM constellation for distortion with the pre-compensation pattern.

4. The method of claim 1 wherein at least one property of nonlinear distortion is an anti-symmetric property between positive and negative amplitude levels.

5. The method of claim 1 wherein the reduction according to at least one property of nonlinear distortion is performed by the following logic:
MSB(0) XOR MSB(1).

6. The method of claim 1 wherein the reduction according to at least one property of nonlinear distortion is performed by the following logic:
MSB(0)=1?.

7. The method of claim 1 wherein the reduction according to at least one property of nonlinear distortion is performed by the following logic:
MSB(−1) XOR MSB(0).

8. A system for mapping an optical N-QAM constellation comprising: a semiconductor optical amplifier (SOA);
logic comprising:
mapping a symbol from the optical N-QAM (quadrature amplitude modulation) constellation into a binary bit set; wherein N is the number of symbols in the constellation;
reducing a length of the binary bit set; wherein the reduction is performed according to at least one property of nonlinear distortion;
generating a lookup table (LUT) address from a LUT address generator; and
adding the LUT address to a LUT of size smaller than N^(2M+1); wherein 2M is the number of neighboring symbols to be stored.

9. The system of claim 8, the logic further comprising:
creating a pre-compensation pattern with data stored in the LUT.

10. The system of claim 9, the logic further comprising:
pre-compensating the optical N-QAM constellation for distortion with the pre-compensation pattern.

11. The system of claim 8 wherein at least one property of nonlinear distortion is an anti-symmetric property between positive and negative amplitude levels.

12. The system of claim 8 wherein the reduction according to at least one property of nonlinear distortion is performed by the following logic:
MSB(0) XOR MSB(1).

13. The system of claim 8 wherein the reduction according to at least one property of nonlinear distortion is performed by the following logic:
MSB(0)=1?.

14. The system of claim 8 wherein the reduction according to at least one property of nonlinear distortion is performed by the following logic:
MSB(−1) XOR MSB(0).

15. An apparatus for mapping an optical N-QAM (quadrature amplitude modulation) constellation comprising:
a semiconductor optical amplifier (SOA);
an address generator circuit to reduce a length of a binary bit set; and
logic comprising:
mapping a symbol from the optical N-QAM constellation into the binary bit set; wherein N is the number of symbols in the constellation;
reducing the length of the binary bit set; wherein the reduction is performed according to at least one property of nonlinear distortion;
generating a lookup table (LUT) address from a LUT address generator; and
adding the LUT address to a LUT of size smaller than N^(2M+1); wherein 2M is the number of neighboring symbols to be stored.

16. The apparatus of claim 15, the logic further comprising:
creating a pre-compensation pattern with data stored in the LUT; and
pre-compensating the optical N-QAM constellation for distortion with the pre-compensation pattern.

17. The apparatus of claim 15 wherein at least one property of nonlinear distortion is an anti-symmetric property between positive and negative amplitude levels.

18. The apparatus of claim 15
the logic further comprising:
MSB(0) XOR MSB(1).

19. The apparatus of claim 15
the logic further comprising:
MSB(0)=1?.

20. The apparatus of claim 15
the logic further comprising:
MSB(−1) XOR MSB(0).

21. The apparatus of claim 15 wherein the size of the LUT is equal to or smaller than 256.

22. The method of claim 1 wherein the size of the LUT is equal to or smaller than 256.

23. The system of claim 8 wherein the size of the LUT is equal to or smaller than 256.

* * * * *